(12) United States Patent
den Besten

(10) Patent No.: US 8,497,713 B2
(45) Date of Patent: Jul. 30, 2013

(54) POWER REDUCTION IN SWITCHED-CURRENT LINE-DRIVERS

(75) Inventor: Willem Gerrit den Besten, Eindhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 13/295,673

(22) Filed: Nov. 14, 2011

(65) Prior Publication Data

US 2012/0119794 A1     May 17, 2012

(30) Foreign Application Priority Data

Nov. 16, 2010    (EP) ................................... 10191427
Nov. 7, 2011    (EP) ................................... 11188114

(51) Int. Cl.
     *H03K 3/00*      (2006.01)

(52) U.S. Cl.
     USPC .......................................... 327/108; 326/82

(58) Field of Classification Search
     USPC ............... 327/108, 109, 112; 326/82, 83, 86, 326/87, 90, 91
See application file for complete search history.

(56) References Cited

U.S. PATENT DOCUMENTS

| | | | |
|---|---|---|---|
| 5,850,158 A * | 12/1998 | Kattmann | 327/375 |
| 5,877,654 A * | 3/1999 | Fong et al. | 330/292 |
| 6,590,422 B1 * | 7/2003 | Dillon | 326/86 |
| 6,762,625 B1 * | 7/2004 | Devnath | 326/115 |
| 7,023,242 B2 * | 4/2006 | Brand et al. | 326/82 |
| 7,312,643 B2 * | 12/2007 | Yanagihara | 327/108 |
| 7,394,293 B1 * | 7/2008 | Waldrip et al. | 326/83 |
| 7,449,919 B2 * | 11/2008 | Lee et al. | 326/83 |
| 7,719,324 B1 * | 5/2010 | Snowdon et al. | 327/108 |
| 7,863,935 B2 * | 1/2011 | Kan et al. | 326/86 |
| 2008/0129348 A1 * | 6/2008 | Shau | 327/108 |
| 2009/0237122 A1 * | 9/2009 | Wenske et al. | 327/108 |
| 2010/0079172 A1 * | 4/2010 | Katoh et al. | 327/72 |
| 2011/0181577 A1 * | 7/2011 | Shirai | 345/211 |
| 2012/0071950 A1 * | 3/2012 | Archer | 607/66 |

* cited by examiner

*Primary Examiner* — William Hernandez

(57) ABSTRACT

A differential switched-current line-driver implements a method to reduce power consumption by eliminating output current that does not contribute to the required differential output signal. This output current is used for example during a training phase, and the current elimination can take place after the training phase is complete.

14 Claims, 5 Drawing Sheets

POWER REDUCTION IN SWITCHED-CURRENT LINE-DRIVERS

This application claims the priority benefit, under 35 U.S.C. §119, of European Patent Application No. 10191427.3, filed on Nov. 16, 2010, and entitled "POWER REDUCTION IN SWITCHED-CURRENT LINE-DRIVERS BY ELIMINATION OF COMMON-MODE CURRENT" and of European Patent Application No. 11188114.0, filed on Nov. 7, 2011, and entitled "POWER REDUCTION IN SWITCHED-CURRENT LINE-DRIVERS", which are each fully incorporated by reference herein.

This invention relates to line drivers, for example for driving serial signals down transmission lines, to enable communication between different pieces of electronic equipment.

Line drivers for high-speed serial interfaces need to drive a characteristic line impedance and therefore tend to consume a significant amount of power in the system.

Although voltage switching is sometimes explored, very often differential pair balanced current driving stages are used, in order to meet speed, impedance continuity, and/or AC common-mode signal requirements. In particular in combination with driver signal pre-emphasis requirements, a differential pair current driving topology is much more practical than a voltage switching topology, as for the current driving scheme, currents can be summed and subtracted very easily to implement pre-emphasis. Pre-emphasis is a finite impulse response filtering technique to provide transmitter-side equalization. It is used to compensate frequency dependent transmission losses, resulting in a significant reduction of inter-symbol interference at the receiver side. The filter may have several taps. A simple case of pre-emphasis is a 2-tap filter to boost signal transitions which results in increased high frequency signal components compared to the low frequency components of the signal.

As the maximum output swing of a driver is typically limited, the low-frequency content may be attenuated instead of boosting the high-frequency content. Therefore, this is sometimes denoted as de-emphasis, but this is essentially the same functionality.

Different driver concepts are shown in FIG. 1. There will typically be a transmission line with a certain characteristic impedance between the driver and load.

Circuit 10 shows a switched voltage driver, in which a switching arrangement couples the voltage source to the load resistor, with polarity depending on the switch configuration. The switches are controlled by the serial data stream, so that a stream of binary bits controls the polarity of the voltage applied to the load 2Ro. The voltage driver comprises a common mode voltage source Vcom and two differential voltage sources Vdif/2, such that the output voltage across the load (ignoring the switching losses) is Vdif, centred on Vcom. Circuit 10 is a DC-coupled implementation, and circuit 10' is an AC coupled implementation with large external capacitors Cac on each side of the load.

Circuit 12 shows a complementary switched current driver. The switching arrangement in this arrangement (again controlled by the input serial data stream) controls the direction in which the current from a pair of current sources is driven through the load. The load is biased by a voltage source to the common mode voltage, and there are two balanced current sources on each side of the common mode voltage. The common mode voltage is connected to the mid point of a circuit branch in parallel with the output load, to provide the desired driver output impedance, and define the common mode level of the output signal. For a double terminated transmission line both transmitter output impedance and receiver load impedance are attempted to be matched. The common mode voltage is mirrored to the mid-point of the output load (with equal current through the two branches). The current driven through the load can thus be adapted without affecting the common mode voltage, because the current sources are balanced on each side of the common mode voltage.

The sourcing and sinking currents of such a complementary driver are equal, and driven to opposite pins of the differential output, so therefore only differential current is flowing through the terminations.

Circuit 12 is a DC-coupled implementation, and circuit 12' is an AC coupled implementation with capacitors Cac on each side of the load.

Circuit 14 shows a sinking switched current driver. The switching arrangement (again controlled by the input serial data stream) controls the direction in which current flows through the output load, and determines the currents through the terminations between a terminal voltage source Vterm and the current source. The current source sinks the current from the voltage source through the terminations. Circuit 14 is a DC-coupled implementation, and circuit 14' is an AC coupled implementation with capacitors Cac on each side of the load.

Circuit 16 shows a sourcing switched current driver. The switching arrangement (again controlled by the input serial data stream) controls the direction in which current flows through the output load, and determines the currents through the terminations between the current source and a terminal voltage source Vterm. The current source sources the current to the voltage source through the terminations. Circuit 16 is a DC-coupled implementation, and circuit 16' is an AC coupled implementation with capacitors Cac on each side of the load.

This invention relates to current driving topologies.

The drawback of a current driving topology is increased power consumption.

Moreover, with decreasing supply voltages, complementary current driving becomes impossible, so that the current sinking or current sourcing arrangements of FIG. 1 have to be used. This implies that the current is driven from one side (currents are unidirectional), while the termination voltage is close to or equal to the opposite supply rail. This provides maximum voltage headroom, but further increases power consumption. Furthermore, this makes the common-mode level dependent on the drive current because a common-mode current will flow through the terminations, causing a level-shift with respect to the termination voltage Vterm, and which is dependent on the drive strength.

For several serial interface standards, a line driver has to support multiple drive levels and/or multiple pre-emphasis levels, where the optimal setting is determined during a training phase. This training phase is used to determine the performance of the transmission line, as this in turn dictates the required level of pre-emphasis in order to compensate for high frequency transmission losses.

When the transmission line is AC coupled with a large external capacitor, it is undesirable that the common-mode level jumps, while changing drive and/or pre-emphasis level. Some standards, for example DisplayPort, even explicitly preclude this. This implies that without further measures the power consumption of the line driver is always as high as the maximum supported drive level, which is undesirable.

According to the invention, there is provided a method to reduce power consumption of a differential switched-current line-driver by eliminating output current that does not contribute to the required differential output signal.

The invention is based on the recognition that the current output of a switched-current line driver can be reduced (with the effect of reducing the common mode voltage) so that the drive current is only that required for the desired differential current operation.

Preferably, this reduction takes place after a training phase during which the required differential current is determined. Thus, preferably the method comprises:

performing a training process to determine the required output current for a desired differential drive, and maintaining a constant output current during the training process; and eliminating the output current that does not contribute to the required differential output current by reducing the total current but maintaining the differential current the same.

In this way, the training process remains reliable. Common-mode changes are avoided during line-driver level-training, and this is combined with gradual elimination of the redundant common-mode current after training, while not disturbing the differential level and/or operation of the link. This allows reducing power consumption to the minimum required amount for the selected drive (and pre-emphasis) levels.

The output current can be generated using a differential switched-current driver comprising a plurality of cells, wherein each cell is controllable to be in any of at least four states, and the method comprises controlling each cell to be in one of the four states, which states comprise:
a) Direct the cell current to a first output;
b) Direct the cell current (Icell) to a second output;
c) Split the cell current equally to the first and second outputs;
d) Disable the cell current so no current is directed to the first or second outputs.

This segmented current driver enables the total output current to be controlled independently from the amount of differential drive current.

Note that instead of splitting a single cell current (state c) above), cells may be paired, so that one cell can be considered to have two sub-cells. The sum of the two currents of the pair of sub-cells can be split equally by making one sub-cell of the pair direct current to the first output and the other sub-cell of the pair direct current to the other output.

The split cell current state for a single cell (instead of a pair of sub-cells) can be achieved by making the differential input voltage of an output stage of the cell zero.

During the training process, cells are switched from the states of directing cell current to the first or second output to the state of spitting the cell current. This keeps the current constant.

During the eliminating process, cells are switched from the state of spitting the cell current to the disabled state. This reduces the total current but maintains the differential current.

In the training process, all cells, or a number of cells known to meet the maximum possible differential current demand, are kept in the directing or splitting states thereby maintaining the total current from the cells constant. This total current is large enough for the training process.

These measures mean that during training, the amount of differential drive current is adapted, while keeping the total output current. This ensures a constant common-mode level. After training the differential drive current is kept constant while the total output current is slowly reduced to the minimum required for the differential signal level.

The invention also provides a differential switched-current driver comprising a plurality of cells, in which each cell supports at least the following four states:
a) Direct the cell current to a first output;
b) Direct the cell current to a second output;
c) Split the cell current equally to the first and second outputs;
d) Disabled the cell current so no current is directed to the first or second output.

Again, a cell can comprise two sub-cells, in which case state c) can be implemented by having one sub-cell of the pair direct current to the first output and the other sub-cell of the pair direct current to the other output.

This driver design is able to perform the method outlined above.

In general, each cell comprises a differential output stage, which is controlled by a logic circuit to implement the cell states.

An analog filter can be provided for smoothing the output current when cell currents are disabled.

Each cell can comprise a two bit control command for controlling the cell state, and comprising a data enable command and a current enable command. This means a simple control word can be used to control the cell states.

The driver can comprise a reference current source generating a reference cell current and each cell comprises a current mirror circuit for mirroring the reference cell current. This ensures uniform cell current from the cells.

Examples of the invention will now be described with reference to the accompanying drawings, in which.

The invention provides a method to reduce power consumption of a differential switched-current line-driver by eliminating output current that does not contribute to the required differential output signal. The invention also provides the line driver itself. This output current may be kept constant for example during a training phase, and the current elimination can take place after the training phase is complete.

In a line-driver according to this invention, the total output current can be controlled independent from the amount of differential drive current.

Preferably, during training the amount of differential drive current is adapted, while keeping the total output current constant. This ensures a constant common-mode level. After training the differential drive current is kept constant while the total output current is slowly reduced to the minimum required for the differential signal level.

Figure 1:
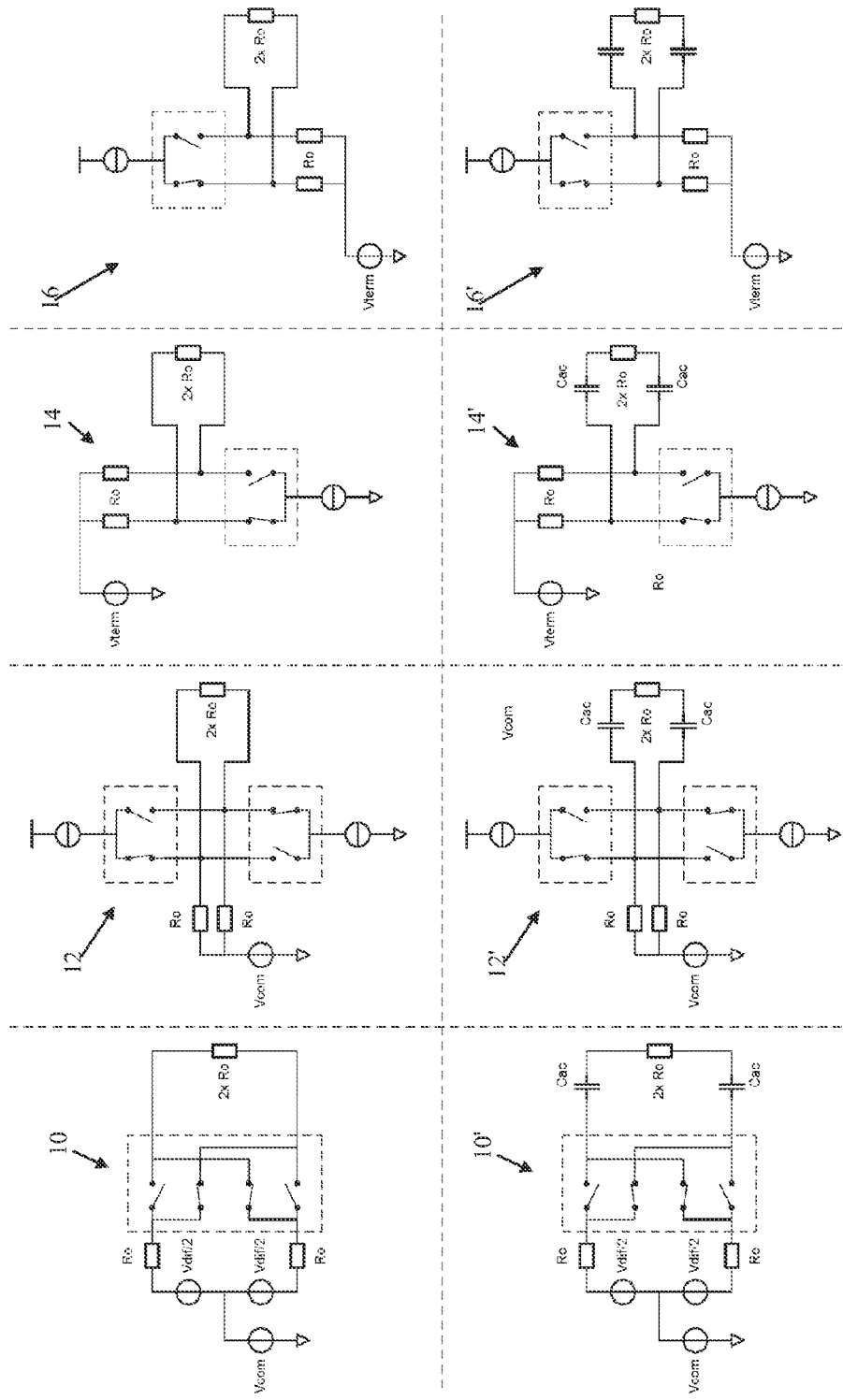
FIG. 1 shows conceptually various line driver types: voltage- and current-switching, dc- and ac-coupled.
Figure 2:
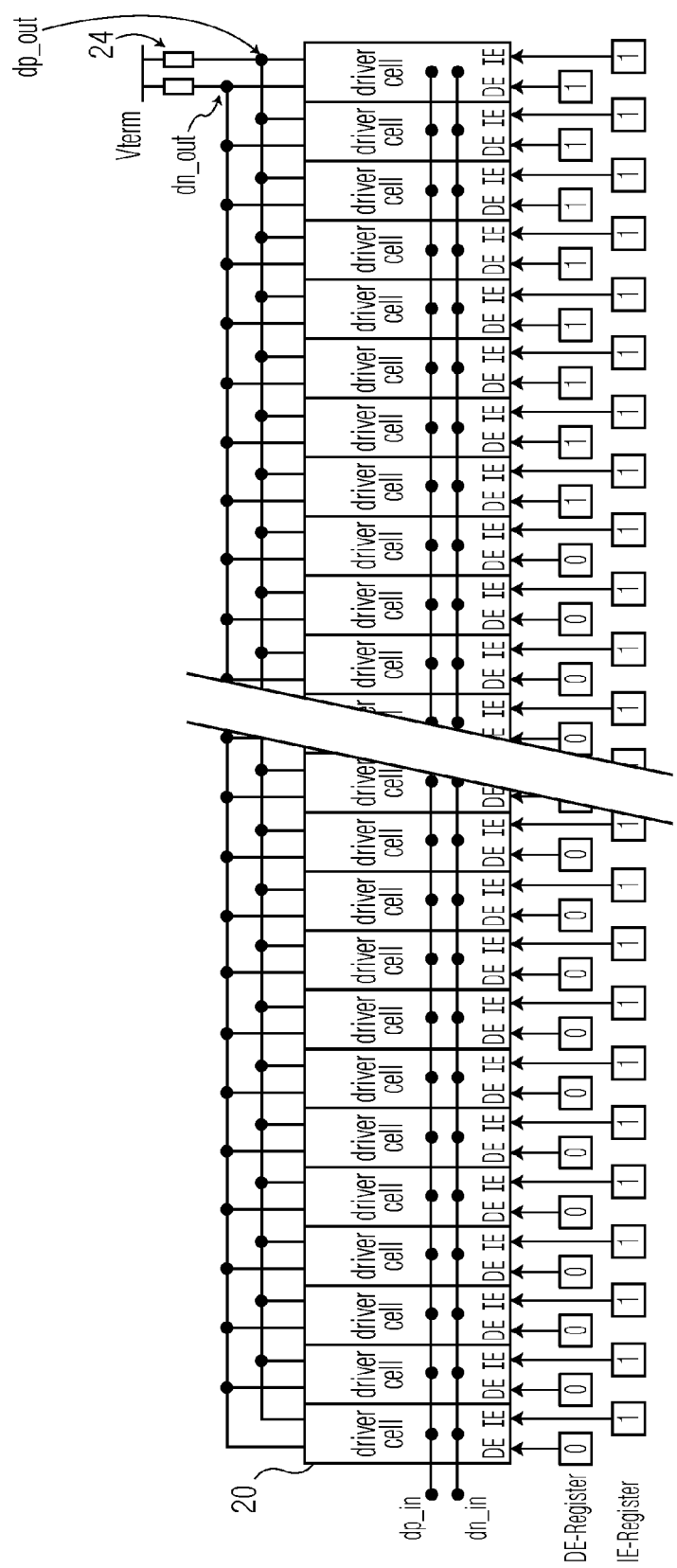
FIG. 2 shows a segmented switched-current line driver topology of the invention.

A current-segmented line driver according to this invention is shown in FIG. 2. It consists of N current driving cells 20, which each receive a data input signal in the form of a differential data input pair dp_in and dn_in, but which are additionally controlled by DE (data enable) and IE (driver cell current enable) bits per cell.

The number N defines the step size or resolution. Furthermore, in case of pre-emphasis, it is desirable to achieve certain ratios between tap coefficients. Based on desired drive-strength resolution, pre-emphasis settings, accuracy, and minimum step size the required number of cells can be determined. In one example, 24 cells enables implementation of 3.5 or 6 or 9.5 dB settings for both drive strength and emphasis.

In general there may be any number of cells based on actual functional requirements and step size, for example 12, 16, 24, 32, 48, 64, or 72 cells. There may be even more cells. The greater the number of cells, the more circuitry required, but the finer the steps of level control, both differentially and common mode.

All cells are connected to common outputs dn_out and dp_out which connect to the opposite sides of the output load. FIG. 2 shows a sinking arrangement, in which a termination voltage Vterm supplies the current cells through resistors 24. Again, the resistors have half the impedance of the output load.

The 'IE' bits [1] enable or [0] disable the cell current 'Icell' per cell. The 'DE' bits determines whether [1] the cell drives a differential output current determined by the polarity of the data input i.e. it sinks all current from one of the two outputs, or [0] split the current 50/50 over both output pins (equilibrium drive).

The current cells thus together control how much current is sinked from the two outputs dn_out and dp_out. The difference in current is the current driven through the load, but it is the total current that determines the common mode voltage.

For example, it can be assumed that a current In is sunk from the output node dn_out, and a current Ip is sunk from the output node dp_out, and the driver termination resistor values are Ro and the differential output load is 2Ro (not drawn). The differential current is In−Ip. The common mode voltage is the mid point between the output terminal dn_out and dp_out:

$$V\text{dif}=(In-Ip)*Ro/2$$

$$V\text{com}=V\text{term}-(In+Ip)*Ro/2$$

$$V_{dn\_out}=V\text{com}-V\text{dif}/2$$

$$V_{dp\_out}=V\text{com}+V\text{dif}/2$$

The invention provides individually controllable current source segments so that the differential voltage and total current can be controlled as separate parameters.

The current outputs of the cells are summed at the output nodes dn_out and dp_out.

Figure 3:
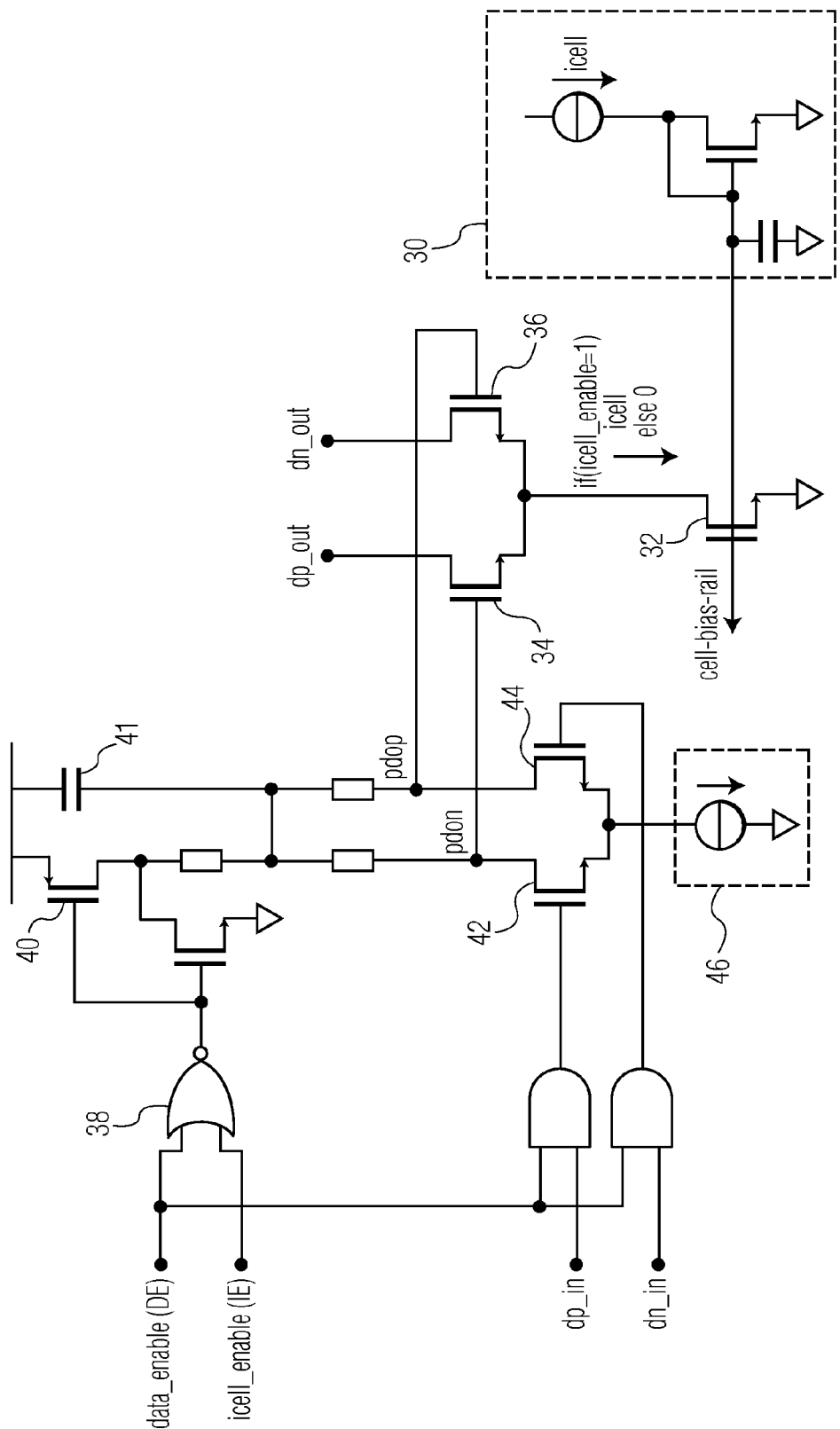
FIG. 3 shows an example of driver cell circuit topology for use in the circuit of FIG. 2.

FIG. 3 shows an example of a possible driver cell topology.

The driver has a reference current source 30 providing a cell current Icell. Each cell has a current mirror transistor 32 for copying the reference current Icell.

The outputs dp_out and dn_out connect to the current mirror transistor 32 through respective output transistors 34 and 36. The remainder of the circuit simply controls the on/off state of these two output transistors.

In the example shown, the transistors 34,36 are n-type and therefore turned on by a high gate voltage.

The control circuit receives as inputs the individual data enable (DE) and current enable (IE) signals, and the data to be transmitted dp_in and dn_in.

The data enable (DE) and current enable (IE) signals are supplied to a NOR gate 38, so that a 1 output is only provided if they are both low. The NOR output controls a p-type input transistor 40. This is only turned off when both data enable (DE) and current enable (IE) signals are low. This has the effect of turning off both transistors 34,36 (because the high voltage rail is no longer feeding the control circuit) and effectively shutting down the cell.

The inputs dp_in and dn-in are provided to a logic circuit of two AND gates, with each input combined with the data enable DE signal in a respective one of the AND gates. These drive control transistors 42,44 which can individually pull down (and therefore off) the output transistors 34,36. If the data enable signal is low, both control transistors are off and no individual control is possible. Instead they will both be turned on if input transistor 40 is on, or they will both be turned off if input transistor is off.

When the data enable signal is 1, the inputs individually control the control transistors so that one or other of the output transistors is pulled high (i.e. on) by current drawn through transistor 40.

A pre-driver bias current source 46 is used to pull current through the control circuit. This draws current through the control transistors 42,44 when they are turned on.

There are four relevant signal combinations:
1. [DE=1, IE=1, dp_in, dn_in=0,1]
   Pulling a current 'Icell' from 'dp_out', almost no current from 'dn_out' (because transistor 36 is pulled off)
2. [DE=1, IE=1, dp_in, dn_in=0,1]
   Pulling a current 'Icell' from 'dn_out', almost no current from 'dp_out' (because transistor 34 is pulled off)
3. [DE=0, IE=1, dp_in, dn_in=do not care]
   The pre-driver bias 46 is pinched-off the inputs to the output transistor pair 34,36 inputs become equal, so a current 'Icell/2' is drawn from both 'dn_out' and 'dp_out'. This will be denoted as equilibrium drive.
4. [DE=0, IE=0, dp_in, dn_in=do not care
   Pre-driver 46 and output bias currents 32 pinched-off, no current drawn from 'dp_out' and 'dn_out'

These different signal combinations enable the differential current as well as the total current to be controlled separately.

The circuit of FIG. 3 is just one example of possible circuit implementation. The important circuit function is that the cell can be controlled to output:
1. No current to any output
2. Equal current to both outputs
3. Differential current to the outputs (i.e. a current drawn from (or supplied to) one of the differential outputs only).

Instead of a driver cell which balances the current within one differential pair by making the inputs of the output stage equal as in the example above, the output stage of the differential pair may also be split in two sub-pairs, each with half the current, which differentially add-up in data driving state, while they differentially subtract (=current equilibrium) for DE=0: one sub-pair pulls a current Icell/2 from 'dp_out' and the other sub-pair pulls a current Icell/2 from 'dn_out' if DE=0 and IE=1. Differential addition or subtraction can be realized by either swapping inputs or outputs for one of the two sub-pairs.

With the DE and IE controls the differential drive level and the common-mode current can be controlled independently. The desired control settings can be established during a training mode.

During training, all IE bits are set to one, or at least as many as required for the maximum possible drive strength that may occur. This means each cell will deliver the current Icell, and this sets the common mode voltage.

During training, the DE bit is determined for every cell to achieve the desirable differential drive strength. This may be a sub-set of the cells, so that some cells keep delivering equal current to the outputs to maintain a constant common mode voltage.

During training the IE bit do not change, so the common-mode output level doesn't change. If after training the selected differential drive level doesn't equal the maximum drive level, there will be cells for which the DE=0 while IE=1. These cells do not contribute to the differential signal level, but do cause a common-mode shift and do consume power.

Figure 4:
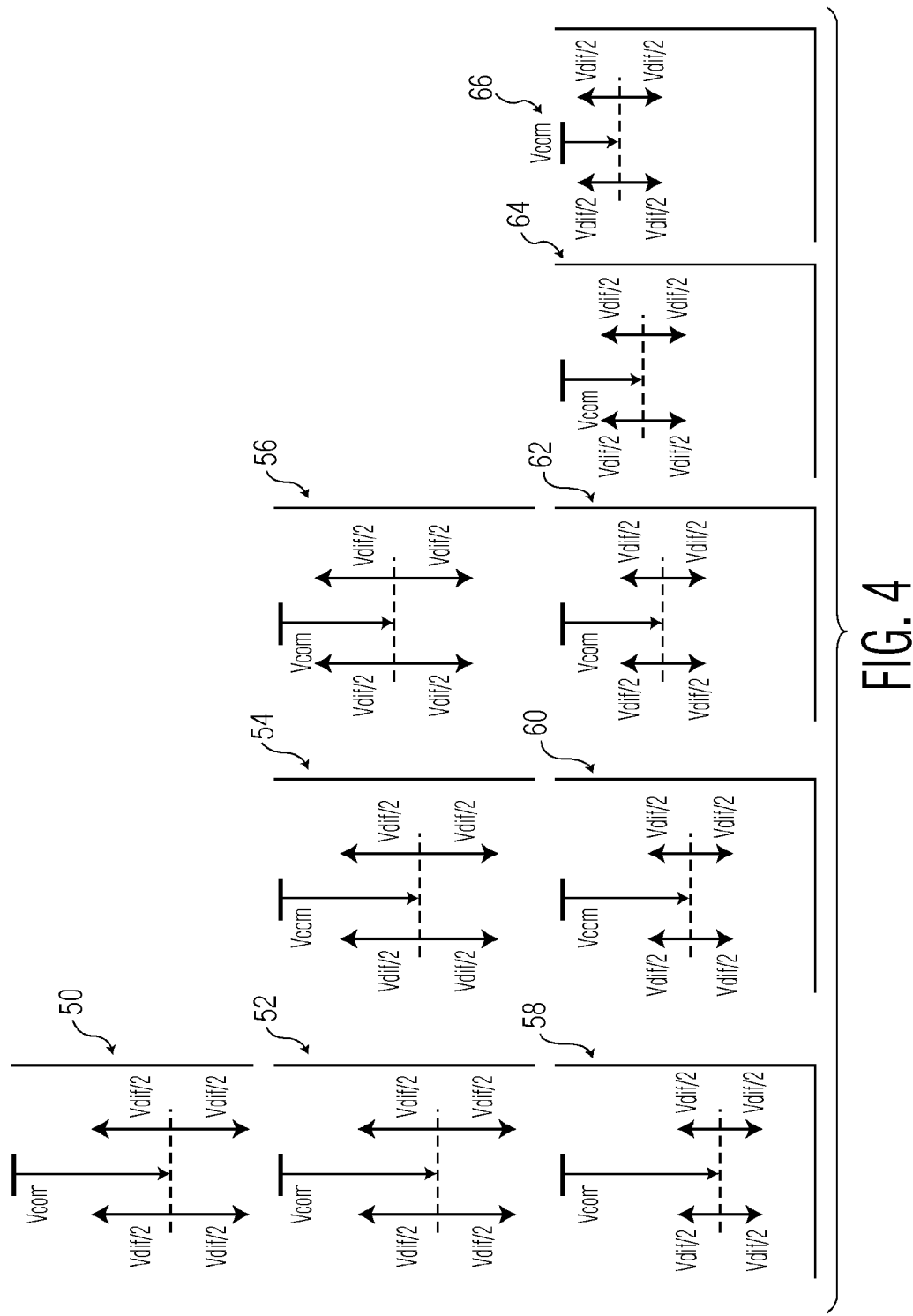
FIG. 4 shows examples of common-mode and differential level behavior for differential level training with constant common-mode, and for power saving steps after training in case of non-maximum differential drive level.

In FIG. 4 some examples are shown.

For maximum drive strength as shown in plot 50 there is no common-current to eliminate as all cells contribute to the differential drive. However, for lower differential amplitudes a substantial amount of current is common-mode, without differential impact, and therefore can be eliminated.

Plots 52,54,56 show the progressive reduction of the common mode voltage Vcom when the differential current is lower.

Plots 58,60,60,62,64,66 show the progressive reduction of the common mode voltage Vcom when the differential current is even lower.

Each reduction in common mode voltage corresponds to a reduction in power consumption.

Elimination of power will change the common-mode level as shown. However, if this is done smoothly, in tiny steps, and spread out over a long time, such that the link can settle between every small step, this will have no impact on functional operation. This is especially useful if AC-coupling capacitors with typically long settling times are applied in the link.

Figure 5:
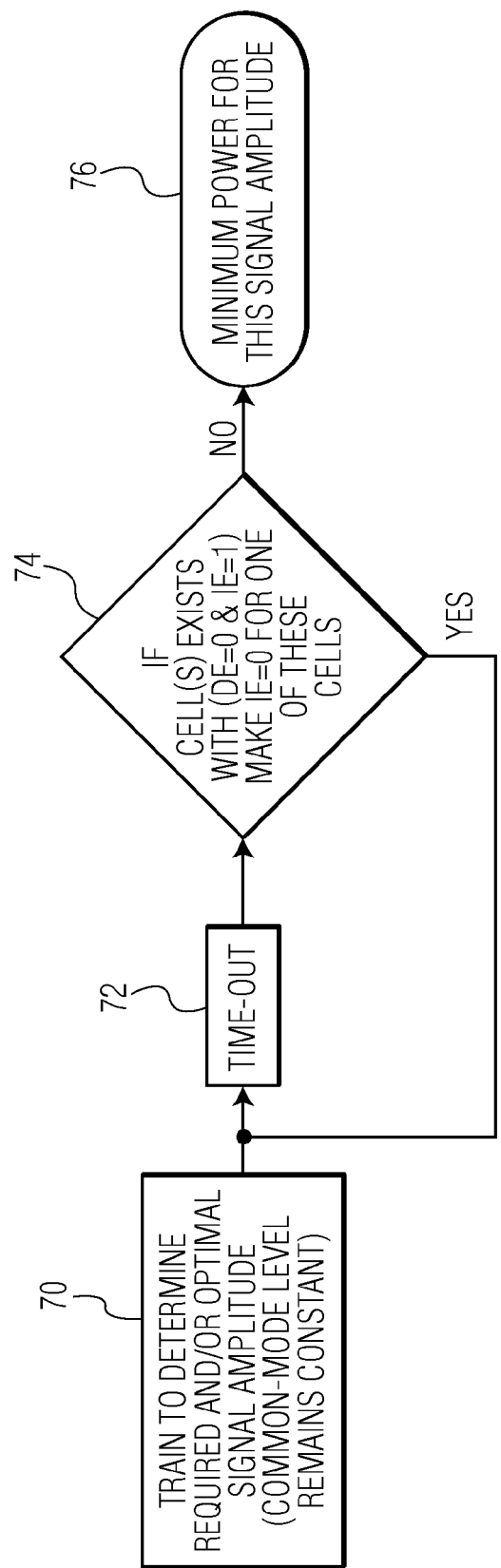
FIG. 5 shows the power consumption reduction process of the invention.

FIG. 5 shows a flow diagram for the elimination of redundant common-mode current.

Step 70 is the training sequence by which the required differential current is obtained, including any required pre-emphasis. This is completed in time-out step 72.

The power reduction process 74 of gradual change in common-mode level takes place after training of levels and pre-emphasis (if required). The process searches driver cells for which DE=0 and IE=1. Each time for one of these cells the IE is set to 0, thereby eliminating a current of Icell/2 to each output pin, and causing a common-mode level change of Icell/2*Rout[DC].

If the number of cells 'N' is large enough, the Icell currents become small, and the resulting common-mode steps will be small too. This process continues until IE=0 for all cells with DE=0. At that moment, all remaining drive current is used to drive a differential signal. This is the minimum power state 76.

The number of cells is preferably sufficient to obtain level steps that fit within the common-mode tolerance of the interface specifications. In this way, the current reduction process has a rate of common-mode level change which is below the time constant of interface common-mode level settling.

Note that switching off one cell current can be smoothened by making it switch-off slowly by means of a filter. In the cell circuit topology example of FIG. 3, this is achieved by slowly switching off the pre-driver stage supply, using a very weak transistor and a large decoupling capacitor 41, which results in slowly pinching off the current source.

In the shown example of a segmented line-driver topology, all cells are connected to a single data input pair, which would only allow for drive level scaling.

Note that the same power reduction concept can be applied if individual cells receive different input signals, for example some cells may get delayed input signals in order to generate pre-emphasis.

Although typically the power reduction process will take place after level training, it may start when it becomes certain that not all available drive power will be needed for the differential swing. As long as the available drive strength (all cells with IE=1) exceed or equals the potentially maximum required differential drive strength.

Although the invention is described with differential pairs which are sinking current from a termination resistor connected to a 'high' voltage, e.g. vdd, the invention can also be applied to complementary schemes with a differential pairs sourcing current into a termination resistor connected to a 'low' level, e.g. vss/ground.

This invention is not restricted to MOS technology but can be applied in any technology which enables implementation of differential pairs, for example with MOS, bipolar or JFET devices.

Various other modifications will be apparent to those skilled in the art.

The invention claimed is:

1. A method to reduce power consumption of a differential switched-current line-driver, comprising:
   eliminating output current that does not contribute to a required differential output signal;
   performing a training process to determine the required output current for a desired differential drive, and maintaining a constant output current during the training process; and
   eliminating the output current that does not contribute to the required differential output current by reducing a total current and maintaining the differential current the same.

2. A method as claimed in claim 1, further comprising generating the output current using a differential switched-current driver comprising a plurality of cells, wherein each cell is controllable to be in any of at least four states, and the method further comprises controlling each cell to be in one of the four states, which said four states respectively comprise:
   a) Direct a cell current (Icell) to a first output (dn_out);
   b) Direct the cell current (Icell) to a second output (dp_out);
   c) Split the cell current (Icell) equally to the first and the second outputs;
   d) Disable the cell current (Icell) so no current is directed to the first or the second outputs.

3. A method as claimed in claim 2 wherein the split cell current state is achieved by making the differential input voltage of an output stage of the cell zero.

4. A method as claimed in claim 2, wherein during the training process, cells are switched from the states of directing cell current to the first or the second output to the state of splitting the cell current.

5. A method as claimed in claim 2, wherein during the eliminating process, cells are switched from the state of splitting the cell current to the disabled state.

6. A method as claimed in claim 2, wherein in the training process, all cells, or a number of cells known to meet the maximum possible differential current demand, are kept in the directing or splitting states thereby maintaining the total current from the cells constant.

7. A differential switched-current driver comprising:
   a plurality of cells, in which each cell supports at least the following four states:
   a) Direct a cell current (Icell) to a first output (dn_out);
   b) Direct the cell current (Icell) to a second output (dp_out);
   c) Split the cell current (Icell) equally to the first and second outputs;
   d) Disable the cell current; so no current is directed to the first output or the second output.

8. A driver as claimed in claim 7, wherein each cell comprises a differential output stage, which is controlled by a logic circuit to implement the cell states.

9. A driver as claimed in claim 8, wherein each cell has an output stage with a differential input, and the split cell current state is achieved by making the differential input voltage of the output stage zero.

10. A driver as claimed in claim 8, wherein each cell comprises an output stage of two sub-differential pairs, at half the cell current each, driven with the same input signal, which output currents are summed one of directly and cross-wise to obtain the cell current directing states and the split current state, respectively.

11. A driver as claimed in claim 8, wherein each cell comprises an output stage of two sub-differential pairs, at half the cell current each, which are driven with one of the same and opposite differential input voltages, and summed output currents, to obtain the cell current directing states and the split current state, respectively.

12. A driver as claimed in claim 7, further comprising an analog filter for smoothing the output current when cell currents are disabled.

13. A driver as claimed in claim 7, wherein each cell comprises a two bit control command for controlling the cell state, and a data enable command and a current enable command.

14. A driver as claimed in claim 7, wherein the driver comprises a reference current source generating a reference cell current and each cell comprises a current mirror circuit for mirroring the reference cell current.

\* \* \* \* \*

UNITED STATES PATENT AND TRADEMARK OFFICE
CERTIFICATE OF CORRECTION

PATENT NO. : 8,497,713 B2  
APPLICATION NO. : 13/295673  
DATED : July 30, 2013  
INVENTOR(S) : Gerrit Willem den Besten Page 1 of 1

It is certified that error appears in the above-identified patent and that said Letters Patent is hereby corrected as shown below:

On the title page [75] INVENTOR: Please replace "Willem Gerrit den Besten" with "Gerrit Willem den Besten".

Signed and Sealed this  
Third Day of December, 2013

Margaret A. Focarino  
*Commissioner for Patents of the United States Patent and Trademark Office*